UNITED STATES PATENT OFFICE.

EDWARD P. EASTWICK, OF BALTIMORE, MARYLAND.

IMPROVED PROCESS FOR TREATING SIRUPS AND SACCHARINE SOLUTIONS.

Specification forming part of Letters Patent No. 47,402, dated April 25, 1865.

*To all whom it may concern:*

Be it known that I, EDWARD P. EASTWICK, of Baltimore, in the county of Baltimore and State of Maryland, have invented a new and useful Improvement in Treating Molasses and Analogous Sirups, the products or mother-liquid remaining after crystallization of the sugar manufacture or refining, and which is not designed to be used for the further separation of crystallizable sugar.

For the purpose of decomposing the coloring compound in the molasses and sirups, as above described, I apply to the same an acid, an acid salt, or a neutral salt, the acids of which, combining with the base of the coloring compound, set the organic coloring-acid free, and thereby effect a change in the appearance by lightening the color, and thus rendering it more desirable for sale or use. To effect this may be mentioned, among other acids, muriatic, sulphuric, nitric, acetic, tartaric acids, &c.; of salts, alum, sulphate of alumina, or other salt the acid of which will combine with the base of the coloring compound. The acid or acid salt is added, either in solution or otherwise, in such quantities as the base of the coloring-salt may require to effect the new combination, or is added until no further change is produced.

The sirups or molasses thus treated may be either stirred until a change is effected, or heated up to any degree until reaching the boiling-point, or boiled until the decomposition is effected.

The apparatus may be either an open or vacuum pan heated by steam or otherwise.

Having thus described my invention, what I claim as new, and desire to secure by Letters Patent, is—

The use of acids, acid salts, or neutral salts for the purpose of decomposing and altering the coloring compounds in molasses and analogous sirups, the products or mother-liquor remaining after the crystallization of the sugar manufacture or refining.

EDWD. P. EASTWICK.

Witnesses:
ALEX. A. C. KLAUCKE,
EDWARD H. KNIGHT.